Sept. 6, 1927.  C. VON GIZINSKY  1,641,910
AUTOMOBILE SIGNAL
Filed Nov. 3, 1926   3 Sheets-Sheet 1

Casimir Von Gizinsky INVENTOR
BY Victor J. Evans ATTORNEY

Sept. 6, 1927.                              1,641,910
C. VON GIZINSKY
AUTOMOBILE SIGNAL
Filed Nov. 3, 1926                3 Sheets-Sheet 2
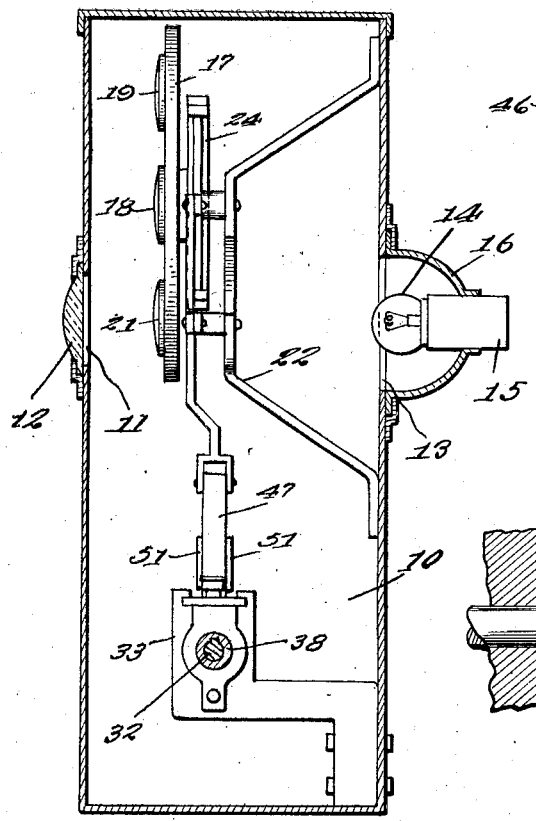
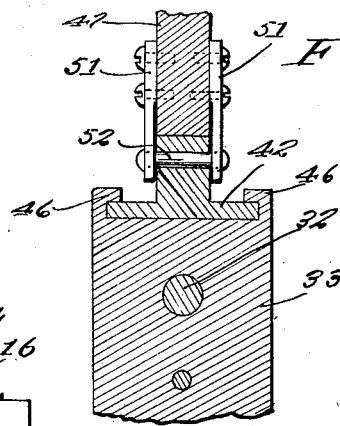
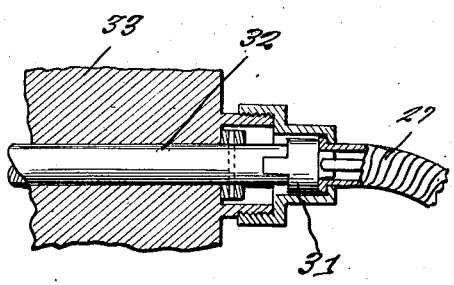
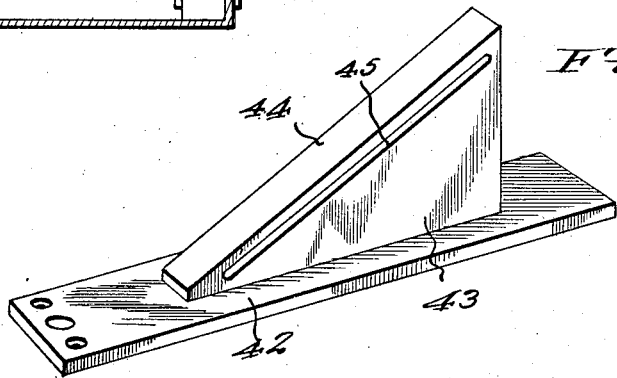
Casimir Von Gizinsky
INVENTOR Sept. 6, 1927.  
C. VON GIZINSKY  
AUTOMOBILE SIGNAL  
Filed Nov. 3, 1926  
1,641,910  
3 Sheets-Sheet 3
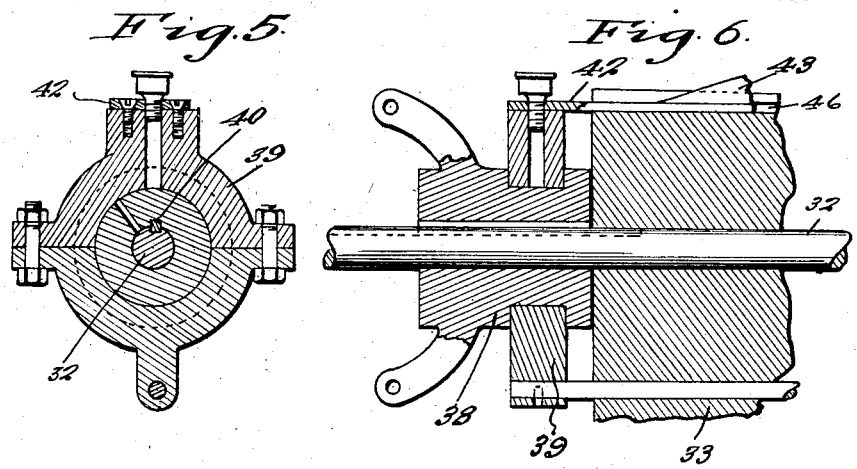
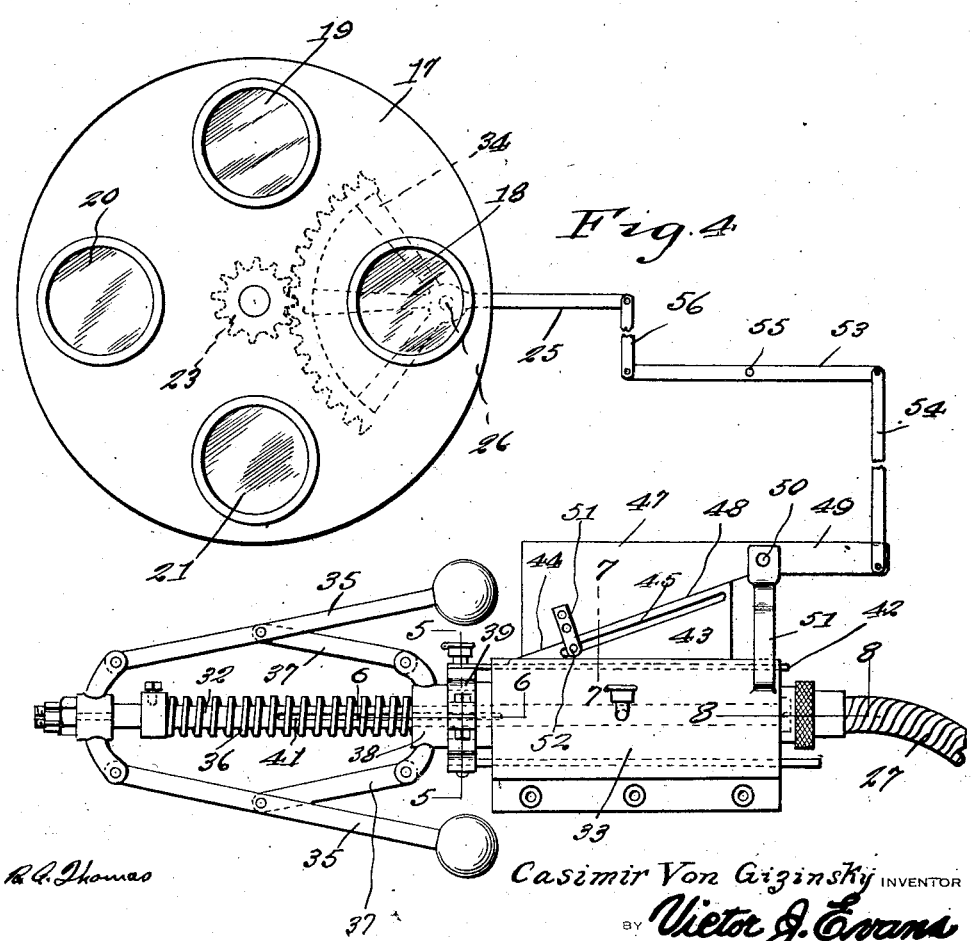

Patented Sept. 6, 1927.

1,641,910

UNITED STATES PATENT OFFICE.

CASIMIR VON GIZINSKY, OF SCHENECTADY, NEW YORK.

AUTOMOBILE SIGNAL.

Application filed November 3, 1926. Serial No. 145,999.

This invention relates to automobile signals, and contemplates a structure including a plurality of signal elements arranged within a suitable casing, each element having a particular significance and arranged to be singly presented to view before a sight opening in said casing as the occasion may require, the signal elements being mounted on a rotatable disk which is operated by means controlled by the speed of operation of the automobile.

The nature and advantages of the invention will be better understood when the following detail description is read in connection with the accompanying drawings, the invention residing in the construction, combination and arrangement of parts as claimed.

In the drawings forming part of this specification like numerals of reference indicate similar parts in the several views and wherein:

Figure 3 is a sectional view taken on line 3—3 of Figure 2.

Figure 4 is a view showing the operating means for the disk upon which is mounted the various signal elements.

Figure 5 is a sectional view on line 5—5 of Figure 4.

Figure 6 is a sectional view on line 6—6 of Figure 4.

Figure 7 is a fragmentary sectional view taken on line 7—7 of Figure 4.

Figure 8 is a sectional view on line 8—8 of Figure 4.

Figure 9 is a detail perspective view of the sliding block forming part of the mechanism for controlling the rotatable disk.

Figure 1:
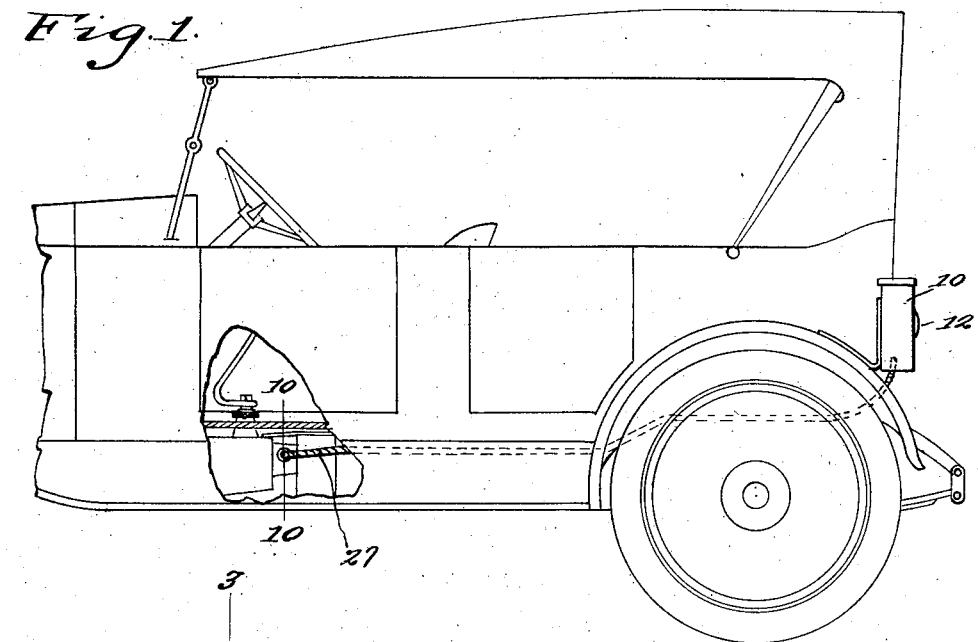
Figure 1 is a fragmentary side elevation of an automobile showing the application of the invention.
Figure 2:
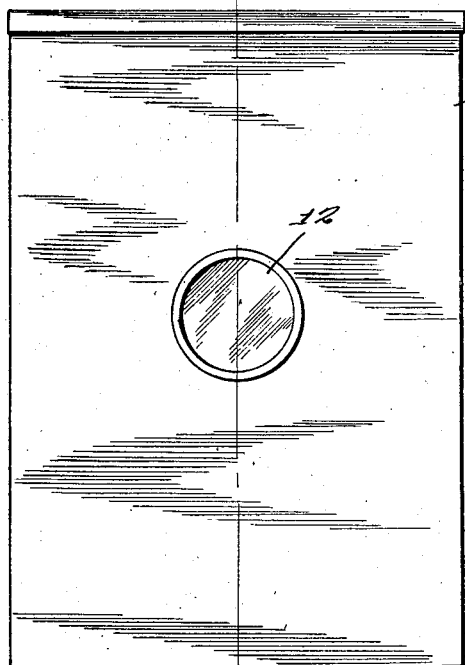
Figure 2 is a view in elevation of the signal casing.

The device forming the subject matter of the present invention comprises a casing indicated at 10 which may be constructed from any suitable material, and also vary in size and configuration without departing from the spirit of the invention. The casing embodies front and rear walls, the former being provided with a sight opening 11 which is covered by a clear lens 12 mounted on the casing in advance of the opening 11 in any suitable manner. Directly opposite this opening 11 is an opening 13 formed in the rear wall of said casing and arranged within this opening is an electric light bulb 14, the socket 15 of which is supported in a reflector 16 surrounding the opening 13 as clearly illustrated in Figure 3. Rotatably mounted within the casing is a disk 17 which is provided with a plurality of signal elements, each having a particular significance with regard to the speed of the machine, and the intention of the driver to either check the speed or bring the vehicle to a stop. These signal elements are preferably in the nature of lenses which are adapted to be singly brought into registration with the openings 11 and 13 respectively of the signal casing, in which position the light rays from the bulb 14 will be projected through the particular signal lens, and also through the lens 12 at the front of the casing. Inasmuch as the signal lenses vary in color, they are distinguished one from the other, and in this manner convey to the drivers of other vehicles the intentions of the operator of the machine so equipped relative to the progress of his machine or the slowing down or stopping thereof. In other words these signal lenses are indicated at 18, 19, 20 and 21 respectively and vary in color as indicated in Figure 4. The lens 18 is colored blue and is arranged before the sight opening 11 when the machine is traveling at or above a predetermined speed, indicating to the drivers of other machines that the machine so equipped intends to continue to progress at this speed. The signal lens 19 is yellow in color, and is brought before the sight opening 11 when the speed of the machine drops from a predetermined high speed to a lower predetermined speed, indicating to the drivers of other vehicles that the machine so equipped is reducing the speed thereof, and operates as a warning to the driver of said other machine to check up in his speed. The signal lens 20 is green in color, and is brought before the sight opening 11 when the speed of the machine so equipped is further reduced in speed, while the signal lens 21 which is red in color is finally brought before the sight opening 11 to indicate to the drivers of other machines that the machine so equipped is about to stop. The disk 17 is mounted upon a suitable bracket 22 arranged within the casing and is equipped with a small gear 23 which meshes with a segmental gear 24 carried by one end of a lever 25 fulcrumed as at 26, all of which form a part of a mechanism for controlling the movements of the disk 17 incident to varying speeds of the machine.

Figure 10:
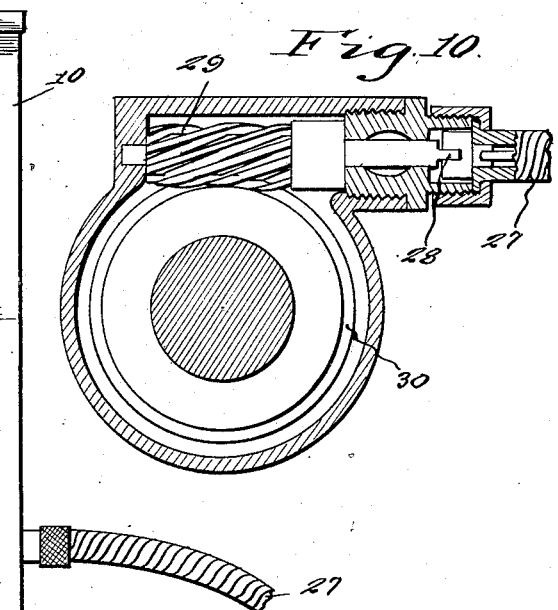
Figure 10 is a sectional view on line 10—10 of Figure 1.

This mechanism includes a driven shaft including a flexible portion 27 which is similar to the ordinary speedometer shaft of an automobile, and which flexible portion is suitably coupled as at 28 in Figure 10 with a worm gear 29 which meshes with a driven gear 30 forming part of the automobile mechanism. The other end of this flexible shaft 28 is suitably coupled as indicated at 31 in Figure 8 with the solid portion of the shaft indicated at 32, and which shaft is journaled in a suitable bearing 33 arranged within the casing 10. Mounted on the shaft section 32 at a point in advance of the bearing 33 therefor is a governor of ordinary well known construction, the weighted arms of which are indicated at 35 and limited in their outward movements against the tension of the sprng 36 by links 37. These links are pivotally connected with the weighted arms 35 and also with the collar 38 which is mounted to slide longitudinally on the shaft section 32 in the usual manner. Surrounding this collar and connected therewith is a two-part clamping ring 39 indicated in Figure 5, which slides with the collar 38, the latter being keyed to the shaft 32. This key is indicated at 40 and operates in a groove or key-way 41 arranged longitudinally of the shaft.

Attached to the clamping ring 39 above mentioned is the elongated base 42 of a sliding block 43, the latter being provided with an inclined upper edge 44 and a slot 45 running parallel with said inclined edge for a purpose to be presently described. By reason of this construction, it is manifest that both the base 42 and the block 43 is moved longitudinally along the bearing 33 of the shaft 32 incident to the operation of the governor above described, or in other words incident to the sliding movements of the collar 38. The base 42 of this block slides in channel-ways or guides 46 formed on the upper side of the bearing 33 for the shaft 32. Mounted upon the block 43 is a similar block 47 having its lower edge inclined as at 48, this block 47 being provided with an extension 49 which is fulcrumed as at 50 upon a suitable bracket 51 rising from the bearing block 33. Arranged at the opposite sides of the block 47 are links 51 which terminate beneath the inclined edge of said block and support a pin 52 which passes through the slot 45 of the block 43, thereby providing a slot and pin connection between the respective blocks 43 and 47. Manifestly when the block 43 is moved longitudinally with relation to the block 47, the cooperating inclined surfaces of these blocks will impart a pivotal movement to the block 47, and thereby operate the segmental gear 24 by reason of the connection between the lever 25 of said gear and the extension 49 of said block. This connection consists in the use of a plurality of levers 53 and 54 which are pivotally connected together as shown in Figure 4, while the lever 53 is fulcrumed at a point between its ends as at 55, and also connected with the lever 25 by the link 56.

In practice, when the machine is in operation, the shaft including the sections 27 and 32 respectively is driven or rotated from the gear 30 forming part of the automobile structure, and the governor above described is actuated by the rotation of said shaft. For the purpose of illustration, assume that the machine is traveling at a speed of thirty-five or more miles an hour. Under these conditions the blue signal lens 18 would be arranged in alignment with the sight opening 11 in the casing, so that it could be readily viewed by the drivers of other vehicles, and used to indicate that it is the intention of the driver of the machine so equipped to continue to drive his machine at such rate of speed. The collar 38 would be limited in its movement along the shaft 32 by the key 40 contacting one end of the slot 41 in said shaft, thereby holding the blue lens 18 in operative position. Now if the driver of the machine checks up his speed, the governor is accordingly affected, and the operating mechanism for the disk 17 will turn the disk to bring the yellow signal lens 19 before the sight opening 11. Upon further reduction of the speed of the machine, the green lens 20 on the disk will be brought before the sight opening 11, this further indicating to the drivers of other machines that the machine so equipped is slowing up in speed, and when the machine is about to stop, the red signal lens 21 assumes its position before the sight opening 11. The mechanism is preferably constructed so that the red lens will assume its position before the sight opening when the machine is traveling at a speed of approximately five to ten miles an hour, while the signal disks 19 and 20 respectively are singly brought to view before the sight opening when the speed of the machine is reduced to predetermined miles per hour, between the maximum speed above mentioned, and the lowest speed for which the red lens is presented to view.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. An automobile signal comprising a casing having a sight opening in one wall thereof, a disk rotatably mounted within the casing and having a gear fixed on the axis thereof, a plurality of signal lenses carried by said disk and varying in color, whereby each lens has a particular significance, governor actuated means controlled by the speed of the automobile for automatically and selectively bringing said lenses to view through said sight opening, said means including a segmental gear meshing with the gear of said disk, a block mounted for sliding movement and connected with said governor, said block having an inclined edge, a second block having a correspondingly inclined edge reposing upon the first mentioned block and mounted for pivotal movement, and actuated incident to the sliding movements of the first mentioned block, a series of levers connecting the second mentioned block with said segmental gear whereby the latter is oscillated to rotate said disk, and a lamp arranged within the casing at the rear of said disk and in direct alignment with the sight opening for the purpose specified.

2. An automobile signal comprising a casing having a sight opening in one wall thereof, a disk rotatably mounted within the casing, a plurality of signal lenses carried by said disk and adapted to be singly and selectively presented to view through said sight opening, a lamp arranged within the casing, and governor actuated means controlled by the speed of the automobile for rotating said disk, said means including a fixed block and a relatively movable block slidably mounted on the stationary block, the adjacent faces of said blocks being inclined, and a connection between the movable block and said disk.

In testimony whereof I affix my signature.

CASIMIR VON GIŻINSKY.